US008260885B2

United States Patent
Lindström

(10) Patent No.: US 8,260,885 B2
(45) Date of Patent: Sep. 4, 2012

(54) METHOD AND SYSTEM FOR BOOTSTRAP OF A DEVICE

(75) Inventor: Magnus Lindström, Karlskrona (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 358 days.

(21) Appl. No.: 11/962,895

(22) Filed: Dec. 21, 2007

(65) Prior Publication Data

US 2008/0155071 A1 Jun. 26, 2008

(30) Foreign Application Priority Data

Dec. 22, 2006 (EP) ..................................... 06127110

(51) Int. Cl.
*G06F 15/177* (2006.01)

(52) U.S. Cl. ..................... 709/220; 709/221; 455/435.1; 455/558; 726/6; 726/9; 726/34

(58) Field of Classification Search .................. 709/220, 709/221; 455/435.1, 558; 726/6, 9, 34

See application file for complete search history.

(56) References Cited

U.S. PATENT DOCUMENTS

| | | | |
|---|---|---|---|
| 6,591,095 B1* | 7/2003 | Palaniswamy et al. ........ | 455/411 |
| 6,957,061 B1* | 10/2005 | Wright ........................... | 455/411 |
| 8,141,136 B2* | 3/2012 | Lee et al. ........................... | 726/6 |
| 2003/0027581 A1 | 2/2003 | Jokinen et al. | |
| 2003/0101246 A1* | 5/2003 | Lahti ............................. | 709/221 |
| 2004/0043788 A1* | 3/2004 | Mittal ........................... | 455/558 |
| 2004/0098715 A1* | 5/2004 | Aghera et al. ................. | 717/173 |
| 2005/0033693 A1 | 2/2005 | Toiminen | |
| 2006/0009214 A1* | 1/2006 | Cardina et al. .............. | 455/432.3 |
| 2006/0039564 A1* | 2/2006 | Rao ................................. | 380/270 |
| 2007/0015538 A1* | 1/2007 | Wang ............................. | 455/558 |
| 2007/0093243 A1* | 4/2007 | Kapadekar et al. ........... | 455/419 |
| 2007/0281691 A1* | 12/2007 | Svensson ................... | 455/435.1 |
| 2007/0294385 A1* | 12/2007 | Kapadekar et al. ........... | 709/223 |
| 2008/0155071 A1* | 6/2008 | Lindstrom ..................... | 709/220 |

OTHER PUBLICATIONS

Open Mobile Alliance. Provisioning Architecture Overview Candidate Version 1.1—Apr. 28, 2005. Open Mobile Alliance. OMA-WAP-ProcArch_V1_1-20050428-C.
Open Mobile Alliance. OMA Device Management Bootstrap. Candidate Version 1.2—Jun. 2, 2006, Open Mobile Alliance. OMA-TS-DS_Bootstrap-V2_1-20060602-C.
3GPP. 3$^{rd}$ Generation Partnership Project; Technical Specification Group Services and System Aspects Service Aspects: Service Principles (Release 6). 3GPP TS 22.101 v6.11.0 (Dec. 2005).

\* cited by examiner

*Primary Examiner* — Yves Dalencourt
*Assistant Examiner* — Michael C Lai

(57) ABSTRACT

Bootstrapping an electronic communication device in a communications network by receiving a detection message from a detection source that a new device/subscriber combination is detected by the communications network and sending a notification message with basic device management parameters and subscriber identification to an operator's business system, notifying the operator's business system that a new device/subscriber combination has been detected, and to send—in response to the notification message—an order message to a smartcard management system to update a smartcard of the device with the basic device management parameters.

28 Claims, 2 Drawing Sheets

METHOD AND SYSTEM FOR BOOTSTRAP OF A DEVICE

This application claims the benefit of EP Patent Application No. EP06127110-2, filed Dec. 22, 2006, the disclosure of which is incorporated herein by reference.

FIELD OF THE INVENTION

The present invention relates to secure bootstrap of a device, and more particularly to secure bootstrap of a device by combining Bootstrap through smartcard, the 3GPP ADD function and secure smartcard management over the air.

BACKGROUND OF THE INVENTION

Mobile terminals have to be configured with various settings to control its operation and to provide various functions and support various services.

One known method of configuration of mobile telephones with service related data is via for example a modified SMS, which includes the relevant settings. This is a unidirectional path and to be able to perform bidirectional service, Open Mobile Alliance (OMA) has specified protocols, data models, and policies for device management (DM). One of the important functions in these specifications is the bootstrap function, which configures the device with basic DM parameters, i.e credentials that facilitate mutual authentication between the DM system and the device, and GPRS connectivity parameters (DM bootstrap).

OMA has defined three different variants of the bootstrap function to support different business models. One method is factory bootstrap, wherein the device is configured with basic DM parameters at manufacture. A second method is DM system initiated bootstrap, wherein the device is configured with basic DM parameters by a DM system over the air. The device may also be configured with basic DM parameters through a smartcard (SIM or USIM), which a third method called Bootstrap via smartcard.

There are, however, several problems and drawbacks associated with systems using these methods.

Factory bootstrap method requires that the basic parameters are known at the time of manufacture or at the time of selling the apparatus. This might be known for telephones to be sold exclusively by an operator. One known method is to configure the mobile telephone at the time of selling the telephone as described in US 2005/0033693 A1. An automatic dispenser is provided, comprising means for configuring the electronic device in response to user input via a user interface. A terminal type, subscription etc. is selected via the user interface and the terminal is automatically configured accordingly, so that the customer can leave the shop with a fully configured terminal.

DM bootstrap method specifies that IMSI (International Mobile Subscriber Identity) must be used to encode the basic DM parameters when a DM system performs bootstrap over the air. This is done by sending an encrypted SMS with the basic parameters to the mobile terminal. The shared secret used for the encryption is the IMSI.

The IMSI has however not been designed to be secret, and thus it is not secret. With access to an IMSI of a particular device a rough DM system can send a bootstrap over the air to that device. The rough DM server can then request the device user to establish a "secure" DM session and then change the device's service configurations in such a way that some or all services stop working. The rough DM system may also get access to sensitive information in the device.

As a complement to the OMA DM specifications (OMA DM) 3GPP has specified the Automatic Device Detection (ADD) function that facilities detection of new device/smartcard combination in a GSM/WCDMA network [3GPP 22.101]. ADD is a function implemented in the HLR (home location register), which checks if the IMEI (International Mobile Equipment Identity) has been added (a new subscriber) or changed for a subscriber (a subscriber changing device).

By supporting the ADD function, combined with DM system initiated bootstrap, the DM system will be notified when a new subscriber is added to the network or an existing subscriber moves its smartcard to another device. Thereby, the DM system has the possibility to automatically send the basic DM parameters over the air to the device and then through a secure DM session configure the device with relevant services.

The Bootstrap over the air method is considered insecure by some operators tried to convince device manufactures to not allow this type of bootstrap in their devices. As a result, depending on device brand and model, it will not be possible to combine the 3GPP ADD function and bootstrap over the air in a DM system to automatically configure relevant services in a device.

Instead operators have preferred bootstrap through smartcard that is considered secure. The operator's business system subscribes on synchronized data, i.e to get a notification when the device has been updated with service related parameters. Provisioning data, i.e basic DM parameters and service related parameters are delivered by the operator's business system to the DM system. These parameters are stored in the DM system.

The DM system is ordered to transfer the stored service related parameters to the device. The DM system assumes that a smartcard with the basic DM parameters has not been inserted in the device and waits for that to happen. The user of the device receives a smartcard with pre-configured basic DM parameters from the operator. The user inserts the smartcard into the device and after switch on, the device reads the basic DM parameters from the smartcard and establishes a DM session to the DM system. The DM system configures the device with service related parameters previously received from the operator's business system. The DM system notifies the operator's business system that service related parameters have been configured in the device.

The disadvantage with bootstrap through smartcard is that it is difficult to combine with the 3GPP ADD function. The main reason for this is that the DM system, when detecting a device, is not aware of what basic DM parameters that have been stored on the smartcard. This means that the DM system, must be configured with the device's basic DM parameters before device detection to allow the device to establish a secure DM session.

Another disadvantage is that there usually exists a lot of smart cards((U)SIM cards) already in use by subscribers, and these needs also to be configured.

It is also a drawback that the ADD function will trigger a change of no use, i.e. it is not taken care of.

A smartcard in a device may also be updated with basic DM parameters over the air. The operator's business system subscribes on synchronized data. i.e to get a notification when the device has been updated with service related parameters. Provisioning data, i.e basic DM parameters (user id, password and GPRS connectivity parameters) and service related parameters (e.g. E-mail settings) are delivered by the operator's business system to the DM system. These parameters are stored in the DM system.

The operator's business system orders the DM system to transfer the stored service related parameters to the device. The DM system assumes that a smartcard with the basic DM parameters has not been inserted in the device and waits for that to happen.

The operator's business system orders a smartcard management system to update the smartcard with basic DM parameters. The smartcard management system downloads the basic DM parameters to the smartcard over the air. As an alternative, the DM system may, after having received the basic data above, deliver the data to the device.

Since no IMSI/IMEI has changed there will be no change detection by the ADD function. That means that DM may be initiated first when the user spontaneously reboot his telephone. Hence, after switch on, the device reads the basic DM parameters from the smartcard and establishes a DM session to the DM system. The DM system configures the device with service related parameters previously received for the operator's business system. The DM system notifies the operator's business system that service related parameters have been configured in the device.

The disadvantage with bootstrap through smartcard is that it is difficult to combine with the 3GPP ADD function. In this case the device has been detected at an earlier point of time, i.e when the smartcard was inserted in the device for the first time. This means that the DM system will not detect the device again when it reads the basic DM parameters from the smartcard. The DM system discovers the device when it tries to establish a secure DM session, but this session will be rejected by the DM system unless it has previously been configured with the device's basic DM parameters.

Thus, drawbacks with this solution is that the ADD function will not detect any change of IMSI/IMEI and the DM system must also be preconfigured with basic data, so that these are already in place when the device attempts to set up its first DM session.

This means that when using smartcard initiated bootstrap, it is not possible to automatically detect a new device/smartcard combination and then securely configure relevant services in the device through OMA DM.

Thus, there is a need for a new method and apparatus for secure bootstrap of the device by combining Bootstrap through smartcard and the 3GPP ADD function, which obviates at least some of the disadvantages cited above.

SUMMARY OF THE INVENTION

It is therefore an object of the present invention to provide a method and apparatus to perform a secure bootstrap of the device by combining Bootstrap through smartcard, the 3GPP ADD function and secure smartcard management over the air.

According to a first aspect, there is provided a method for bootstrap of an electronic communication device in a communications network, comprising the steps of: receiving a detection message from a detection source that a new device/subscriber combination is detected by the communications network; and in response to the detection message, sending a notification message with basic data management, DM, parameters and subscriber identification to an operator's business system, notifying the operator's business system that a new device/subscriber combination has been detected, and for sending—in response to the notification message—an order message to a smartcard management system to update a smartcard of the device with the basic DM parameters and subscriber identification.

According to a second aspect, there is provided an apparatus for bootstrap of an electronic communication device in a communications network, configured to receive a detection message from a detection source that a new device/subscriber combination is detected by the communications network; and in response to the detection message, send a notification message with basic data management, DM, parameters to an operator's business system, notifying the operator's business system that a new device/subscriber combination has been detected, and for sending—in response to the notification message—an order message to a smartcard management system to update a smartcard of the device with the basic DM parameters.

According to a third aspect, there is provided a method for bootstrap of an electronic communication device in a communications network, comprising the steps of: receiving a notification message with basic data management, DM, parameters from a device management system, notifying that a new device/subscriber combination has been detected, and for sending—in response to the notification message—an order message to a smartcard management system to update a smartcard of the device with the basic DM parameters; and in response to the notification message sending an order message to the smartcard management system to update the smartcard of the device with the basic DM parameters.

According to a fourth aspect, there is provided an apparatus for bootstrap of an electronic communication device in a communications network, configured to: receive a notification message with basic data management, DM, parameters from a device management system, notifying that a new device/subscriber combination has been detected, and for sending—in response to the notification message—an order message to a smartcard management system to update a smartcard of the device with the basic DM parameters; and in response to the notification message, sending an order message to the smartcard management system to update the smartcard of the device with the basic DM parameters.

According to a fifth aspect, there is provided a computer program comprising program instructions for causing a computer to perform the method.

Further embodiments of the invention are defined in the dependent claims.

An advantage of the invention is that it may provide but is not limited to a secure bootstrap of the device by combining Bootstrap through smartcard, the 3GPP ADD function and secure smartcard management over the air.

It should be emphasized that the term "comprises/comprising" when used in this specification is taken to specify the presence of stated features, integers, steps, or components, but does not preclude the presence or addition of one or more other features, integers, steps, components, or groups thereof.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

BRIEF DESCRIPTION OF THE DRAWINGS

The invention will now be described, by way of example, with reference to the accompanying drawings, wherein.

DETAILED DESCRIPTION

Figure 1A:
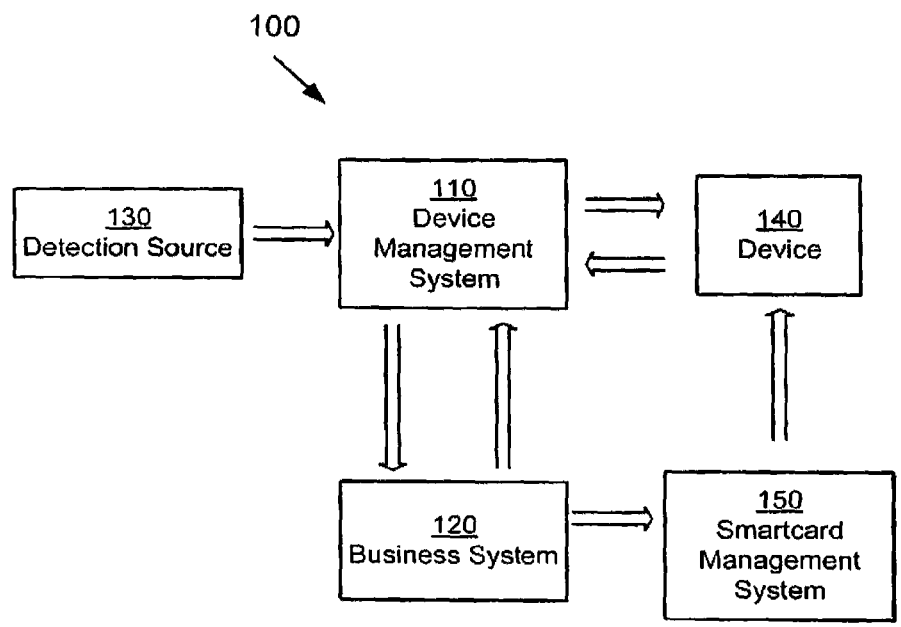
FIG. 1A discloses a communication system according to one embodiment of the invention.

FIG. 1A discloses a part of a telecommunications network 100 that supports a combination of Bootstrap through smartcard, the 3GPP Automatic Device Detection (ADD) function and secure smartcard management over the air according to an embodiment of the invention. The telecommunications network 100 may support but is not limited to GSM/WCDMA.

The telecommunications network 100 comprises but is not limited to a device management (DM) system 110 according to an embodiment of the invention, which is configured to communicate with at least one operator's business system 120, detection source 130, and electronic communication device 140. Moreover, the telecommunications network 100 may comprise a smartcard management system 150.

The detection source 130 may be a home location register (HLR), which is used for storing user profiles.

The term electronic communication device, terminal or communication apparatus includes portable radio communication equipment. The term portable radio communication equipment includes all equipment such as mobile telephones, pagers, communicators, i.e electronic organizers, smartphones or the like.

Figure 1B:
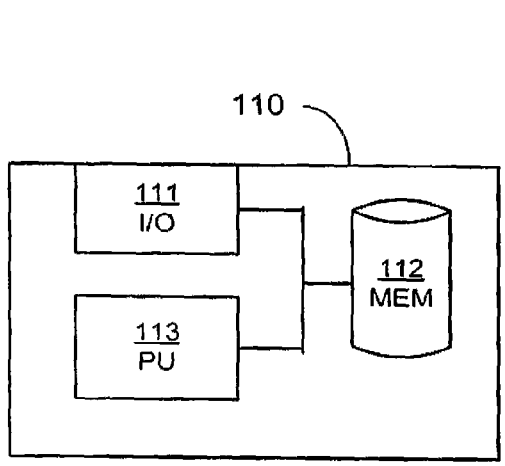
FIG. 1B illustrates a data management system according to one embodiment of the invention.

FIG. 1B discloses a DM system according to an embodiment of the invention. It comprises but is not limited to an input/output (I/O) unit 111 for conducting communication directly or indirectly between other nodes 110, 120, 130, 140 and 150 of the telecommunications network 100. It also comprises a memory MEM 112 for storing for example device/subscriber identities, and a processing unit PU 113 for controlling the operation of the DM system.

Figure 1C:
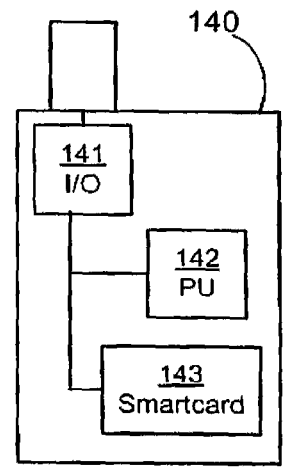
FIG. 1C illustrates a block diagram of a mobile communication device.

FIG. 1C illustrates a block diagram of an embodiment of a mobile communication device 140. The mobile communication device 140 includes an input/output (I/O) unit 141 conducting communication between the device 140 and other nodes of the telecommunications network 100. The I/O unit 141 is particularly provided for receiving provision data, including basic DM parameters and service related parameters, from the DM system 110; a request from the DM system 110 to the user of the device 140 in order to switch off and then switch on the device; and to initiate a DM session with the DM system. In addition the I/O unit 141 may receive management operations containing basic DM parameters from the smart card management system. The mobile communication device 140 also includes a processing unit PU 142 for controlling the operation of the device 140, and a smartcard 143 for storing and handling of the basic DM parameters received from the smartcard management system. The smartcard 143 may be a (U)SIM card used in for example but not limited to GSM/WCDMA. Moreover, the smartcard 143 may be associated with a service agreement identifier or subscription identifier, e.g IMSI or MSISDN or mobile telephone number, allowing identification of the user and its service agreement.

Information identifying the device is also provided in the device 140, for example a hardware or terminal identifier or number, e.g IMEI (International Mobile Equipment Identity). The identifier may also identify the model of the device.

The device 140 may also comprise means, e.g hardware and/or software, such as program code, enabling the mobile unit to support different services, such as SMS, and GPRS. Some of these means may be pre-installed in the device at manufacture or at sale, while other means, such as settings for MMS messaging, email, and/or WLAN may be downloaded from a network operator or service provider.

By combining Bootstrap through smartcard, the 3GPP ADD function and secure smartcard management over the air, a DM system that detects a new device/smartcard combination can automatically request the operator's business system to send basic DM parameters to a smartcard of the electronic communication devices. This is done through an order message to a smartcard management system to update a smartcard of the device. These basic DM parameters may be customized by the DM system based on the detected device model (add to claims).

The DM system may then receive provisioning data from the operator's business system and sends an SMS message that requests the device user to reboot (switch off and switch on) the device. When the device is switched on it may read the basic DM parameters from the smartcard and establish a secure DM session to the DM system. During this session the DM system configures the device with necessary settings based on information previously received from the operator's business system.

Figure 2:
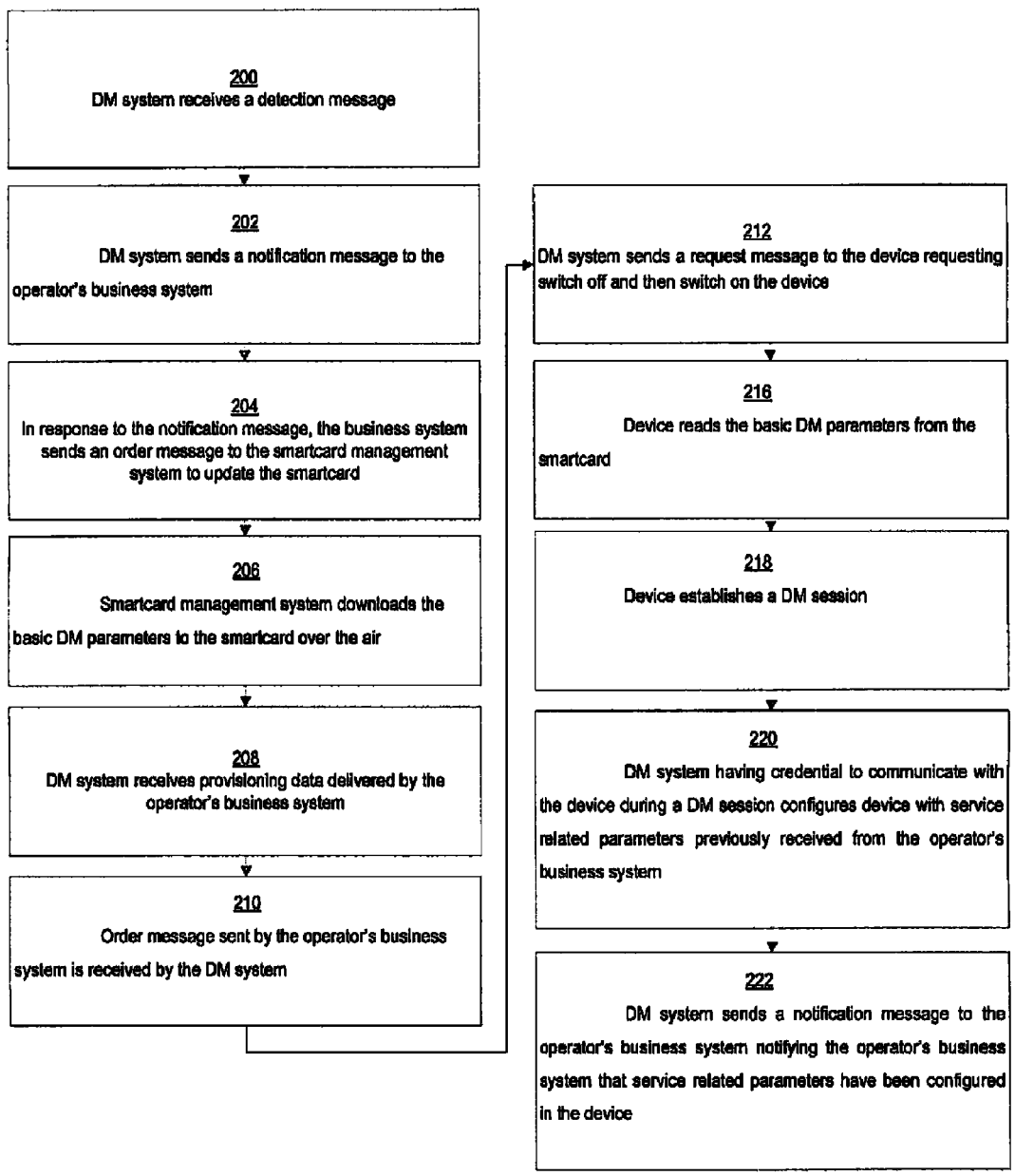
FIG. 2 is a flowchart illustrating a method according to one embodiment of the invention.

FIG. 2 is a flowchart illustrating a method for providing secure automatic Open Mobile Alliance (OMA) DM configuration of an electronic communication device according to one embodiment of the invention.

The operator's business system 120 subscribes on synchronized data from the DM system 110, i.e to get a notification when an electronic communication device 140 has been updated with service related parameters. The operator's business system also subscribes on new device/subscriber combinations.

The DM system 110 receives a detection message from the detection source 130 when a new device/subscriber combination is detected by the GSM/WCDMA network in step 200. The DM system 110 sends a notification message to the operator's business system 120 in step 202 to notify that a new device/subscriber combination has been detected. The DM system may include device/subscriber identities, and the basic DM parameters, which may be customized for the device 140. The identity of the subscriber may be for example an IMSI (International Mobile Subscriber Identity) and the identity of the terminal may be for example an IMEI (International Mobile Equipment Identity).

In response to the notification message, the business system 120 sends an order message to the smartcard management system 150 in step 204 to update the smartcard of the device 140 with the basic DM parameters received from the DM system 110. The also contains subscriber identification, for example IMSI. The order message may also contain device identification, for example IMEI. The basic parameters may be sent with the order message in step 204. In response to the order message in step 204, the smartcard management system 150 downloads the basic DM parameters to the smartcard of the device 140 over the air in step 206. The smartcard management system 150 has credential to communicate with the smartcard of the device for updating the basic DM parameters of the smartcard.

In an alternative embodiment, the Device Management system may generate customized basic DM parameters based on the model of the detected device, to be sent with the notification message.

In an alternative embodiment, it is not necessary to know the terminal type during bootstrap but this information can be fetched later during the "device management phase/session".

The DM system 110 receives provisioning data, including service related parameters, for example but not limited to settings for MMS, Email, and/or WLAN, delivered by the operator's business system 120 in step 208. These parameters are stored in the DM system 110.

An order message sent by the operator's business system 120 is received by the DM system 110 in step 210 to transfer the stored service related parameters to the device 140. In response to the order message, the DM system 110 sends a request message—for example by means of an SMS message—to the device 140 requesting the user of the device 140 in step 212 to switch off and then switch on the device.

In response to the device 140 being switched on by the user, the device reads the basic DM parameters from the smartcard in step 216 and establishes a DM session to the DM system in step 218. The DM system—having credential to communicate with the device 140 during a DM session—configures the device in step 220 with service related parameters previously received from the operator's business system 120.

In response to a completed configuration, the DM system 110 sends a notification message to the operator's business system 120 in step 222 notifying the operator's business system that service related parameters have been configured in the device 140.

Thereby the method and system of the invention facilitates secure automatic OMA DM configuration of a device when the device is switched on for the first time for minimizing the time a terminal is un-configured. As a result the number of calls to customer services will be fewer.

Moreover, the invention may facilitate secure automatic OMA DM configuration of an old device when the device is switched on with a smartcard exchanged since the device was switched on the last time.

The invention may also facilitate customized OMA DM bootstrap through smartcard, i.e the DM system can customize the basic DM parameters that will be sent to the smartcard based on the detected device model.

The many features and advantages of the invention are apparent from the detailed specification, and thus, it is intended by the appended claims to cover all such features and advantages of the invention, which fall within the scope of the invention. However, although embodiments of the method and apparatus of the invention has been illustrated in the accompanying drawings and described in the foregoing detailed description, the disclosure is illustrative only and changes, modifications and substitutions may be made without departing from the scope of the invention as set forth and defined by the following claims.

Although the embodiments of the invention described with reference to the drawings comprise computer apparatus and processes performed in computer apparatus, the invention also extends to programs on or in a carrier, adapted for putting the invention into practice. The program may be in the form of source code, object code a code suitable for use in the implementation of the method according to the invention. The carrier can be any entity or device capable of carrying the program. For example the carrier may be a record medium, computer memory, read-only memory or an electrical carrier signal. Embodiments according to the invention may be carried out when the computer program product is loaded and run in a system having computer capabilities.

The invention claimed is:

1. A method for bootstrapping an electronic communication device in a communications network, comprising the steps of:
    providing a smartcard management system configured to update a smartcard of the device with basic device management parameters, wherein the basic device management parameters are user name and/or password and necessary general packet radio service (GPRS) connectivity data to facilitate the device management session;
    receiving a detection message from a detection source that a new combination of device and subscriber is detected by the communications network;
    in response to the detection message, sending a notification message with basic device management parameters and subscriber identification to an operator's business system, notifying the operator's business system that the new combination of device and subscriber has been detected; and
    sending, by the operator's business system in response to the notification message, an order message to the smartcard management system, having credentials to communicate with the smartcard of the device, to update the smartcard of the device with the basic device management parameters.

2. The method according to claim 1, further comprising:
    receiving provisioning data, including service related parameters, from the operator's business system; and
    receiving an order message from the operator's business system to transfer the service related parameters to the electronic communication device.

3. The method according to claim 2, further comprising:
    in response to the order message, sending a request message to the electronic communication device requesting the user of the device to switch off and then switch on the device.

4. The method according to claim 2, further comprising:
    receiving a request for establishing a device management session with the device based on the basic device management (DM) parameters; and
    in response to the request, configuring the device with the service related parameters.

5. The method according to claim 4, further comprising:
    in response to a completed configuration, sending a notification message to the operator's business system notifying the operator's business system that service related parameters have been configured in the device.

6. The method according to claim 1, further comprising:
    in response to the detection message, generating customized basic device management parameters based on the model of the detected device, to be sent with the notification message.

7. The method according to claim 1, wherein the service related parameters, includes a setting selected from the group consisting of multimedia messaging service (MMS) messaging, email, and a wireless local area network (WLAN).

8. The method according to claim 1, wherein the notification message is sent by means of a short message service (SMS) message.

9. The method according to claim 1, wherein the basic device management parameters are customized for the device.

10. The method according to claim 1, wherein the subscriber identification is an International Mobile Subscriber Identity (IMSI).

11. The method according to claim 1, wherein the notification message includes a device identification.

12. The method according to claim 11, wherein the device identification is an International Mobile Equipment Identity (IMEI).

13. A method for bootstrapping an electronic communication device in a communications network, comprising the steps of:
providing a smartcard management system configured to update a smartcard of the device with basic device management parameters, wherein the basic device management parameters are user name and/or password and necessary general packet radio service (GPRS) connectivity data to facilitate the device management session;
receiving, by an operator's business system, a notification message with basic device management parameters and subscriber identification from a device management system, notifying the operator's business system that a new combination of device and subscriber has been detected; and
in response to the notification message, sending by the operator's business system an order message to the smartcard management system having credentials to communicate with the smartcard of the device to update the smartcard of the device with the basic device management parameters.

14. The method according to claim 13, further comprising:
in response to the notification message, sending a message with service related parameters, to the device management system; and
sending an order message to the device management system to transfer the service related parameters to the electronic communication device.

15. The method according to claim 14, further comprising:
receiving a another notification message from the device management system notifying the operators business system that service related parameters have been configured in the device.

16. An apparatus for bootstrapping an electronic communication device in a communications network, the electronic communication device having a smartcard in communication with a smartcard management system, the apparatus configured to:
receive a detection message from a detection source that a new combination of device and subscriber is detected by the communications network;
send, in response to the detection message, a notification message to an operator's business system with basic device management parameters and subscriber identification, notifying the operator's business system that the new combination of device and subscriber has been detected, wherein the operator's business system is configured to send, in response to the notification message, an order message to the smartcard management system having credentials to communicate with the smartcard of the device to update the smartcard of the device with the basic device management parameters; and
wherein the basic device management parameters are user name and/or password and necessary general packet radio service (GPRS) connectivity data to facilitate the device management session.

17. The apparatus according to claim 16, further configured to:
receive provisioning data, including service related parameters, from the operator's business system; and
receive an order message from the operator's business system to transfer the service related parameters to the electronic communication device.

18. The apparatus according to claim 17, further configured to:
send a notification message to the electronic communication device requesting the user of the device to switch off and then switch on the device.

19. The apparatus according to claim 18, further configured to:
receive a request for establishing a device management (DM) session with the device based on the basic device management parameters; and
configure the device with the service related parameters.

20. The apparatus according to claim 19, further configured to:
send a notification message to the operator's business system notifying the operator's business system that service related parameters have been configured in the device.

21. The apparatus according to claim 19, wherein the service related parameters, includes a setting selected from the group consisting of multimedia messaging service (MMS) messaging, email, and a wireless local area network (WLAN).

22. The apparatus according to claim 19, further configured to send the notification message by means of an short message service (SMS) message.

23. The apparatus according to claim 19, wherein the communications network is a global system for mobile communications (GSM)/wideband code division multiple access (WCDMA) network.

24. An apparatus for bootstrapping an electronic communication device in a communications network, the electronic communication device having a smartcard in communication with a smartcard management system, the apparatus configured to:
receive a notification message with basic device management parameters from a device management system, notifying that a new combination of device and subscriber has been detected, wherein the basic device management parameters are user name and/or password and necessary general packet radio service (GPRS) connectivity data to facilitate the device management session; and
in response to the notification message, sending an order message to a smartcard management system having credentials to communicate with a smartcard of the device to update the smartcard of the device with the basic device management parameters.

25. The apparatus according to claim 24, further configured to:
in response to the notification message, send a message with service related parameters, to the device management system; and
send an order message to the device management system to transfer the service related parameters to the electronic communication device.

26. The method according to claim 25, further configured to:
receive a notification message from the device management system notifying the operator's business system that service related parameters have been configured in the device.

27. A non-transitory computer readable medium having computer-executable instructions stored thereon for bootstrapping an electronic communication device in a communication network, wherein the program instructs a processor to perform the following steps:
- receive a detection message from a detection source that a new combination of device and subscriber is detected by a communications network;
- send, in response to the detection message, a notification message with basic device management parameters and subscriber identification to an operator's business system, notifying the operator's business system that the new combination of device and subscriber has been detected, and in response to the notification message, sending by the operator's business system an order message to a smartcard management system having credentials to communicate with a smartcard of the device, to update the smartcard of the device with the basic device management parameters; and
- wherein the basic device management parameters are user name and/or password and necessary general packet radio service (GPRS) connectivity data to facilitate the device management session.

28. An apparatus for bootstrapping an electronic communication device in a communications network, the electronic communication device having a smartcard in communication with a smartcard management system, the apparatus is configured to perform a specific sequence of operations as follows:
- receive a detection message from a detection source that a new combination of device and subscriber is detected by the communications network;
- send, in response to the detection message, a notification message to an operator's business system with basic device management parameters and subscriber identification, notifying the operator's business system that the new combination of device and subscriber has been detected, wherein the operator's business system is configured to send, in response to the notification message, an order message to a smartcard management system having credentials to communicate with a smartcard of the device to update the smartcard of the device with the basic device management parameters, wherein the basic device management parameters are user name and/or password and necessary general packet radio service (GPRS) connectivity data to facilitate the device management session;
- receive provisioning data, including service related parameters, from the operator's business system;
- receive an order message from the operator's business system to transfer the service related parameters to the electronic communication device;
- send a notification message to the electronic communication device requesting the user of the device to switch off and then switch on the device;
- receive a request for establishing a device management (DM) session with the device based on the basic device management parameters;
- configure the device with the service related parameters; and send a notification message to the operator's business system notifying the operator's business system that service related parameters have been configured in the device.

\* \* \* \* \*